US008392702B2

(12) United States Patent
Qiu et al.

(10) Patent No.: US 8,392,702 B2
(45) Date of Patent: Mar. 5, 2013

(54) TOKEN-BASED MANAGEMENT SYSTEM FOR PKI PERSONALIZATION PROCESS

(75) Inventors: Xin Qiu, San Diego, CA (US); Eric Sprunk, Carlsbad, CA (US); Liqiang Chen, San Diego, CA (US); Jason Pasion, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 1067 days.

(21) Appl. No.: 12/175,444

(22) Filed: Jul. 17, 2008

(65) Prior Publication Data

US 2009/0031131 A1 Jan. 29, 2009

Related U.S. Application Data

(60) Provisional application No. 60/952,419, filed on Jul. 27, 2007.

(51) Int. Cl.
H04L 29/06 (2006.01)
(52) U.S. Cl. ............. 713/159; 380/277; 380/279; 726/9
(58) Field of Classification Search .................. 713/172, 713/155–156, 158–159, 182, 185; 726/2–10, 726/26–27, 30; 380/277–279, 281, 286, 380/44
See application file for complete search history.

(56) References Cited

U.S. PATENT DOCUMENTS

| | | | |
|---|---|---|---|
| 5,142,578 A * | 8/1992 | Matyas et al. ................. | 380/280 |
| 6,959,089 B1 | 10/2005 | Sprunk | |
| 6,985,583 B1 * | 1/2006 | Brainard et al. ................. | 380/44 |
| 7,028,181 B1 * | 4/2006 | McCullough et al. ........ | 713/156 |
| 7,047,409 B1 * | 5/2006 | Aull et al. ...................... | 713/173 |
| 7,069,439 B1 | 6/2006 | Chen et al. | |
| 7,243,366 B2 | 7/2007 | Medvinsky et al. | |
| 7,260,224 B1 * | 8/2007 | Ingle et al. ..................... | 380/279 |
| 7,302,487 B2 * | 11/2007 | Ylonen et al. ................. | 709/229 |
| 7,548,620 B2 * | 6/2009 | Popp .............................. | 380/273 |
| 7,552,322 B2 * | 6/2009 | Balfanz et al. ................ | 713/159 |
| 7,707,405 B1 * | 4/2010 | Gilman et al. ................. | 713/156 |
| 2001/0054148 A1 * | 12/2001 | Hoornaert et al. ............. | 713/172 |
| 2003/0115466 A1 * | 6/2003 | Aull et al. ...................... | 713/172 |
| 2003/0115468 A1 * | 6/2003 | Aull et al. ...................... | 713/175 |
| 2004/0123114 A1 * | 6/2004 | McGowan ..................... | 713/186 |
| 2006/0236111 A1 * | 10/2006 | Bodensjo et al. ............. | 713/176 |

OTHER PUBLICATIONS

PCT International Search Report & Written Opinion for PCT/US08/70832. Issued Oct. 22, 2008.

(Continued)

*Primary Examiner* — Aravind Moorthy
*Assistant Examiner* — Eric W Shepperd
(74) *Attorney, Agent, or Firm* — Lori Anne D. Swanson

(57) ABSTRACT

A system for token-based management of a PKI (public key infrastructure) personalization process includes a token request and management system (TRMS) configured to gather request information from a requestor; and a token personalization system (TPS) configured to personalize a hardware token such that usage of the hardware token is constrained by the request information. A method for token-based management of a PKI personalization process includes: requesting a hardware token; personalizing a hardware token such that the hardware token is confined to operation within limiting parameters; binding the hardware token to a workstation which is configured receive the hardware token and use credentials within the hardware token to request and download PKI data from a PKI server, the workstation being further configured to personalize an end user product by loading the PKI data into internal memory contained within the end user product; and monitoring usage of the hardware token and the PKI data.

11 Claims, 14 Drawing Sheets

OTHER PUBLICATIONS

Yehuda Lindell, "The Security Advantages of Hardware Tokens over Software Tokens for PKI Applications", White Paper, Aladdin Knowledge Systems, Ltd., May 2006.

Aladdin Knowledge Systems, Ltd., "Authentication Tokens: The Key to Secure PCs and Data", White Paper, Aladdin Knowledge Systems, Ltd., Sep. 2006.

C.J. Kolodgy, "Identity Management in a Virtual World", IDC White Paper, Jun. 2003.

Aladdin Knowledge Systems, Ltd., "Strong Authentication: Securing Identities and Enabling Business, White Paper", Aladdin Knowledge Systems, Ltd., Jan. 2006.

* cited by examiner

TOKEN-BASED MANAGEMENT SYSTEM FOR PKI PERSONALIZATION PROCESS

RELATED APPLICATIONS

This application claims priority under 35 U.S.C. §119(e) from the filing date of a U.S. provisional patent application having Ser. No. 60/952,419, entitled "Token-Based TLS PKI System", filed on Jul. 27, 2007 which is incorporated herein by reference in its entirety.

BACKGROUND

Systems and methods for transferring or delivering digital information to various end user devices or products may often include authenticating the user or corresponding device and then encrypting the digital information for delivery. One type of authentication and encryption technique is based on public key cryptography, which involves a public key and a corresponding private key. The public key may be widely published or distributed across a communications network, while the corresponding private key is held in secret by the authorized end user or device. In public key cryptography, the private key is used by its owner to generate a signature over a message that can be verified with the corresponding public key. Additionally, the private key may be used to decrypt a message that was encrypted by a third party using the matching public key. In either case, the correspondence between the private and public keys allows the private key owner to authenticate data being sent or uniquely receive data that is inaccessible to anyone else.

In systems that use public key cryptography, one concern is determining whether a public key is authentic, i.e., verifying that a received public key corresponds to the private key of the purported user or device and has not been replaced or otherwise compromised. One way of addressing this concern is through the use of a public key infrastructure (PKI). This generally involves a certificate authority (CA) that certifies a user/device's public key and its identity. During the certification process, the CA usually generates the certificate that binds the user/device's public key with its identity and also manages the certificate's lifecycle from generation to expiration and/or revocation.

Although the keys referenced by the certificate could be generated by the user/device, for efficiency and logistical reasons, the keys and certificate are often generated ahead of time and loaded onto the device at a product personalization facility. The keys and one or more certificates are collectively referred to as PKI data. This PKI data later will be used by various security applications running in the device to protect the access to data/content, networks, and services. Much of this PKI data is generated at a key generation facility, which is also operated as a certification authority (CA) for a specific product. The key generation facility is usually a trusted facility that is separate from the product personalization facility.

In many cases, the product personalization facility may not be a secure or trusted environment. PKI data distributed to the product personalization facility for loading onto products can be compromised in a manner that will allow later unauthorized access to products manufactured at the product personalization facility. In one scenario, a private key along with its public key certificate is stolen and then copied on to other unauthorized and illegitimate computers and or devices, thus creating clones that all pretend to have a legitimate identity to access the network, services or restricted content.

In factories and service facilities where consumer devices are personalized or serviced there is a need for a secure system and method for ensuring that sensitive data is securely generated, delivered, and consumed.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
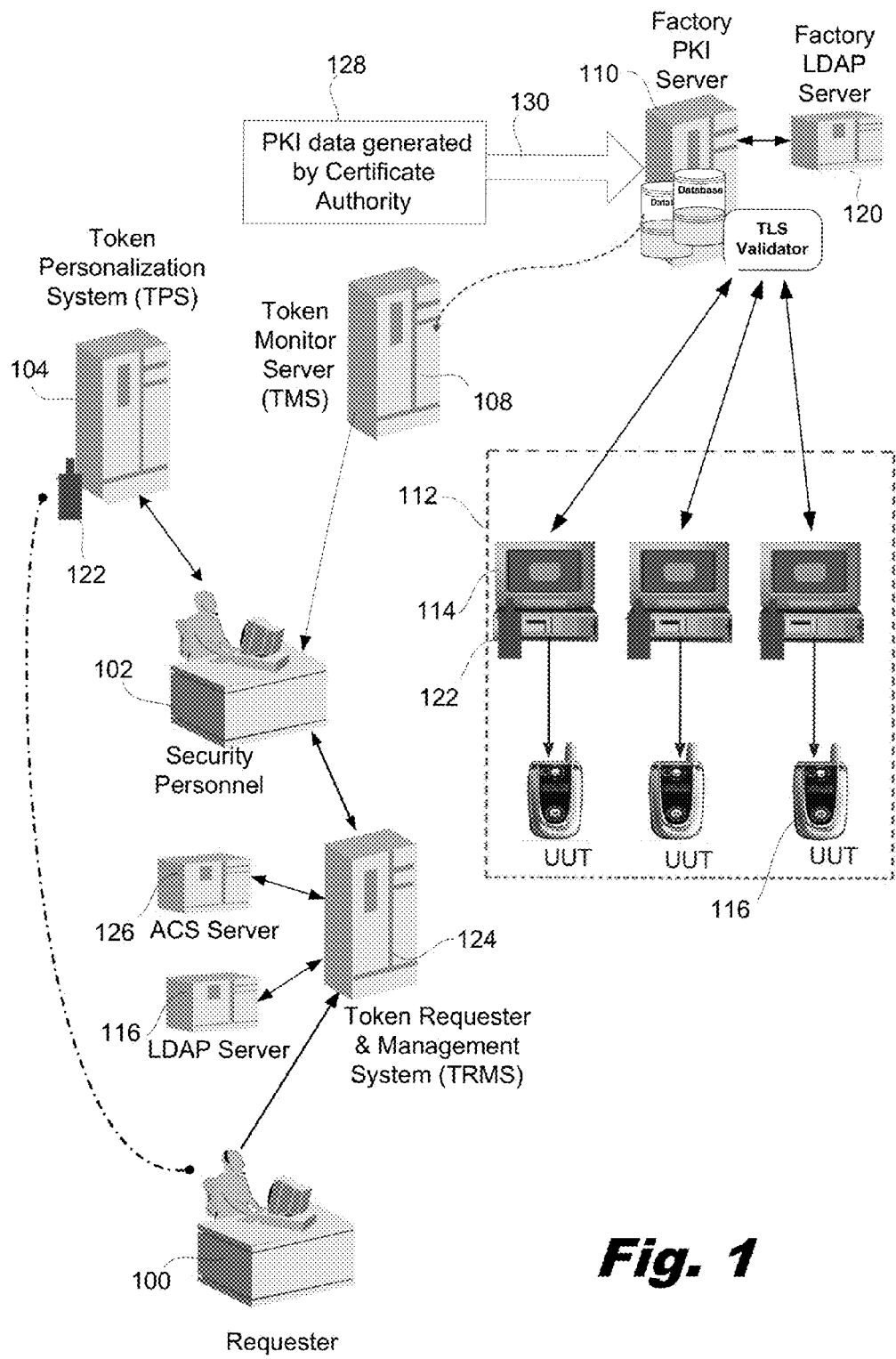
FIG. 1 is a diagram showing an illustrative hardware token-based PKI system for manufacturing processes, according to one embodiment of principles described herein.

The present specification describes systems and methods for requesting, creating, enabling, and monitoring hardware tokens used within a manufacturing PKI system to increase the security of PKI data delivery to end user products from a centralized and trusted key generation facility to an insecure and un-trusted product personalization facility.

As used herein and in the appended claims, the term "hardware token" or "token" will refer to a hardware device including memory and, in some cases, a processor that can be selectively connected to a computer or workstation to selectively provide data or functionality to that computer or workstation that is only available so long as the token is in communication with that computer or workstation. Consequently, tokens can be used to control sensitive processes conducted using specific computers or workstations. As will be described herein, public key infrastructure (PKI) can be used to protect the content, operation and creation of hardware tokens. In some examples, a hardware token may be a dongle connected to a host computer system via a Universal Serial Bus (USB) connection.

In summary, a token-based management system for PKI personalization secures the process of delivering PKI data to products that are being personalized in unsecure and untrusted environments. The use of a hardware token with a strong binding to a workstation can aid in the delivery, protection and verification of "trust" as the workstation interacts with the PKI server. Several characteristics of the hardware token described herein prevent its theft, compromise, and subsequent misuse. The hardware tokens can be requested by an authorized factory/product staff (known as a requester) using the Token Requester and Management System (TRMS). The hardware token can be assigned and personalized to a specific location-based trust domain and a specific workstation based on the information provided by the requester. This prevents the hardware token from being stolen and used in an alternative location or computer. The hardware token's credentials are also associated with access control lists (ACLs) which are created for each PKI data that is specific to a product. ACLs are created based on the product information provided by the requester and populated to designated PKI servers by TRMS. If the hardware token/workstation is used to make a PKI data download request that is not authorized, the request will be rejected by the PKI server. A token monitoring system is also in place to monitor ACLs as well as the actual usage of the token throughout its lifecycle. Misuse of the token will result in a review, suspension, or revocation of the token.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The present specification describes a large scale, hardware token-based public key infrastructure (PKI) management system that is configured to personalize various electronic devices during a manufacturing processes. The hardware tokens are used to provide client authentication for Transport Layer Security (TLS) connections between a workstation and a server. The hardware tokens may also be used for signing and encrypting the messages sent between the stations and various application/PKI servers. The management system used for requesting hardware tokens, creating hardware tokens, methods for using hardware tokens to authenticate client workstations, and hardware token lifecycle management mechanisms are described.

TLS is a widely used protocol for establishing secure, authenticated, and encrypted channels across public (i.e., untrusted) networks. This protocol is incorporated in the factory personalization network with the use of a hardware token to provide "client" authentication and/or "client" access control. This system could be deployed across a plurality of factory sites that are located around the globe and used to deliver millions of PKI data sets to various devices (such as phones, set-top boxes, cable modems and other infrastructure devices, etc). For purposes of discussion herein, the term "PKI data" refers to digital certificates, private/public keys, symmetric keys and/or other confidential information, such as passwords or other secret values that are loaded into manufactured devices. The term "personalization" refers to loading and assigning a device with PKI data, which will be used by various security applications running in the device to securely access networks, services, or restricted data content.

The subsystems within the hardware token-based management system for PKI personalization are then described. These subsystems are: 1) The token requester subsystem that allows factory staff to order hundreds of hardware tokens through a batch token request to facilitate transactions between a large number of client workstations and PKI servers; 2) The token generation subsystem that uses the information submitted in the token requester subsystem to generate hardware tokens for target client workstations; 3) A token validation tool for factory staff to deploy/install hundreds of hardware tokens to their target client workstations; and 4) The token monitoring and management subsystem that is used to track the usage and access permissions of the hardware tokens.

Hardware tokens used as part of a multifactor authentication scheme within a PKI security system can provide significantly higher levels of authentication and trust, which is very much needed in an unsecure and untrusted factory/repair service environment. Possession or control of the hardware token can be required in addition to other authentication means, such as the entry of a user identification and/or password. The hardware token can provide strong evidence of the origin of a PKI request and prevent undue reliance on a user generated and user supplied secrets for security. User generated secrets or passwords are often unreliable sources of security because they are predictable or easily guessed.

A hardware token may further be bound to a particular workstation, domain, or authentication server. The hardware token may be inoperable when it is separated from the workstation or domain to which it is bound, preventing the misuse of a stolen token. Further, a hardware token that is bound to a particular workstation provides strong evidence of data transfer and consumption by that workstation. In contrast to software elements, a hardware token is a physical object which can be inventoried and tracked. As mentioned above, the addition of a hardware token to the software based security system can result in a better user authentication, evidence of origin, evidence of transfer and delivery of PKI data, evidence of consumption, and evidence of data retention.

The hardware token may take many embodiments including an RJ45 jack that plugs into an Ethernet adaptor, smart cards, parallel port dongles, or a USB flash drives. The hardware tokens may incorporate a variety of techniques for more secure authentication. According to one exemplary embodiment, the hardware token contains the private key in a PKI system. The private key cannot be extracted from the hardware token. In another embodiment, tokens may use one-time passwords or time synchronized passwords that change constantly at a set time interval, e.g. once per minute. Other hardware tokens can have miniaturized keypads for the entry of a pin when authenticating a user, or require the entry of biometric identification such as a fingerprint. Hardware tokens may communicate with a security system in a variety of ways including through a computer interface such as a USB or parallel port; through Bluetooth or other wireless protocols; through swiping a card through a card reader, or through other proprietary protocols.

A token based PKI system may be comprised of a plurality of interconnected elements. According to one exemplary embodiment, the elements could be named for their particular function: Token Requester and Management System (TRMS)—online application servers that can be accessed either via Internet or corporate Intranet; Token Personalization System (TPS)—an offline system located in a secure and trusted environment; Token Monitor Server (TMS)—online servers that are connected to factory/service center PKI servers; PKI servers (as TLS servers)—application servers located at factories and service centers; and workstations (as TLS clients)—PKI distribution stations located at factories and service centers where consumer products receive PKI data from a PKI server. These elements, for ease of explanation, are illustrated and described as separate elements that are interconnected by one or more communication networks. However, it is understood that the functionality of one or more of these elements could be combined or contained with a single server, computer, or application. Further, the functions of the described elements could be distributed across multiple computers, servers, or be performed in diverse physical locations.

FIG. 1 is an illustrative diagram of one exemplary embodiment of a PKI-based manufacturing system that incorporates token-based security. The PKI system attempts to secure the transfer of PKI and other enabling data within the personalization facility (112) to prevent its misuse. A requester (100) logs into a token requester and management system (TRMS) (124) and then submits the information describing the target workstation and the server/domain to which this target workstation will be connected. According to one exemplary embodiment, the requester (100) uses a SecureID® mechanism along with a user domain/user name as login credentials.

The TRMS (124) verifies the requester's SecureID® login using an access control server (ACS) (126). The user domain name is verified using a lightweight directory access protocol (LDAP) server (116). The requester (100) may be a factory manager or other supervisory personnel who are aware of a need for product PKI data within their area of responsibility. After the requester (100) submits his/her request via the TRMS (124), an email notification is generated by the TRMS (124) and sent to security personnel (102). Security personnel (102) are typically vetted individuals who are authorized to process requests.

According to one exemplary embodiment, the security personnel (102) then logs into the TRMS to download the request, and then manually transfers the token request to the token personalization system (TPS) (104), which operates in an off-line, secure environment. The manual interaction by the security personnel (102) can serve as a security measure and an opportunity for human verification of the authenticity of the request and identity of the requester (100). According to one exemplary embodiment, access and connections to the TPS (104) are restricted to security personnel (102), thereby reducing the risk of unauthorized access to the TPS (104) and its internal data. According to one exemplary embodiment, the TPS (104) generates the required data (certificate(s) and/ or keys) and then transfers the data to nonvolatile memory within the hardware tokens (122). As discussed above, the transfer of data, particularly data which provides a digital identity to the receiving device, is called "personalization." The personalized tokens (122) are then shipped to the requester (100) or a location designated by the requester (100).

When the hardware token contains a signing key, the signing key should not be exposed to others to reduce the possibility of a third party falsifying or spoofing message signatures. According to one illustrative embodiment, the signing key pair is generated inside the hardware token and the public key is extracted from the token and used by the certificate authority to generate the certificate. The token certificate is then transferred back to the token. The private key is not and cannot be extracted from the hardware token. The private key is only indirectly available for signing messages.

When the hardware token contains a key pair used for data encryption, the private encryption key should be backed up so that the encrypted content can be recovered if the hardware token is damaged or lost. According to one illustrative embodiment, the encryption key pair is generated outside the hardware token. The key pair along with the certificate will be transferred back to the hardware token. A copy of the key pair remains in a second secure location.

Following receipt of the tokens (122), the tokens (122) are installed on target workstations (114). The tokens (122) contain certificates and one or more key pairs which are used to secure communications between the workstations (114) to a server. According to one exemplary embodiment, the server is a PKI server (110) that holds various PKI data that need to be loaded onto different devices/products. The PKI server (110) receives PKI data through a secure channel and distributes PKI data to end user products within the distribution center or factory (112). The workstations (114) are used to load the PKI data onto the products, also known as "units under test" (UUT) (116). The units under test (116) can be any suitable device that uses keys and/or other PKI data or information to securely access networks, services, data, or other content. By way of example and not limitation, the units under test (116) may include cable modems, digital video recorders (DVR), signal converters/decoders, set-top boxes, or personal video recorder (PVR) devices. Other suitable manufactured products are a digital video disk recorder, a television, and any suitable mobile end user communication device, such as a cellular telephone, a smart phone, a personal digital assistant (PDA) device or other wireless handheld device, a digital camera, a laptop personal computer (PC) or a notebook PC.

The communication between a PKI server (110) and the workstations (114) within a manufacturing environment (112) can be made via two-way TLS connections. Two-way TLS connections allow for the mutual authentication of both the host and the client. In the example illustrated in FIG. 1, the PKI server (110) is the host and the workstations (114) are the client workstations. Tokens (122) are used to provide the client authentication during the TLS communication.

In addition, each hardware token (122) is exclusively bound to a particular workstation (114) or other machine. When the operator of a workstation (114) desires to obtain PKI data from the PKI server (110), a request is made through the two-way TLS connection to the PKI server (110). Information that identifies the operator, such as a username and password can be signed with the key/certificate of the hardware token (122) that is bound to the workstation (114). The PKI server (110) receives the information and verifies it. By way of example and not limitation, portions of the operator information may be further verified using a factory LDAP server (120). The factory LDAP server (120) may contain a directory of all currently employed persons who are authorized to operate a workstation, which shift they work, which workstations/domain names are assigned to a particular operator, etc. The factory LDAP server (120) may also contain information about the type and number of products that are currently under test in the personalization facility (112). If the transmitted information is verifiable, the PKI server (110) encrypts and sends the PKI data to the workstation via the two-way TLS connection.

The PKI server receives and stores connection information provided by the workstations/tokens during the PKI distribution and personalization of the units under test (116). The connection information is retrieved by a Token Monitor Server (TMS) (108) which is also connected to the Token Requester and Management System (TRMS) (124). The TMS (108) monitors the workstations (114) and factory PKI server (110) in order to detect irregular token usage and unauthorized token permission change. Once irregular usage or unauthorized permission change are detected, the TMS (108) initiates token revocation and/or suspends requests. The TRMS (124) then implements the token revocation and/or suspension by updating token permission/token revocation information on the PKI server (110). The PKI server (110) then rejects subsequent workstation/token connections using the token that has been revoked or suspended.

The system and method described above are intended to describe one embodiment that could be used to implement secure delivery of PKI data through the use of hardware tokens. Many alternative configurations could be used. For example, a more robust system could be created by utilizing a pair of PKI servers (110) at each factory location. If one PKI server (110) needed to be taken offline for maintenance or an upgrading, the matching PKI server could handle the PKI requests from the factory floor. By implementing a redundant PKI server configuration, the factory processes will not be disrupted if one PKI server fails or is taken off line.

Figure 2:
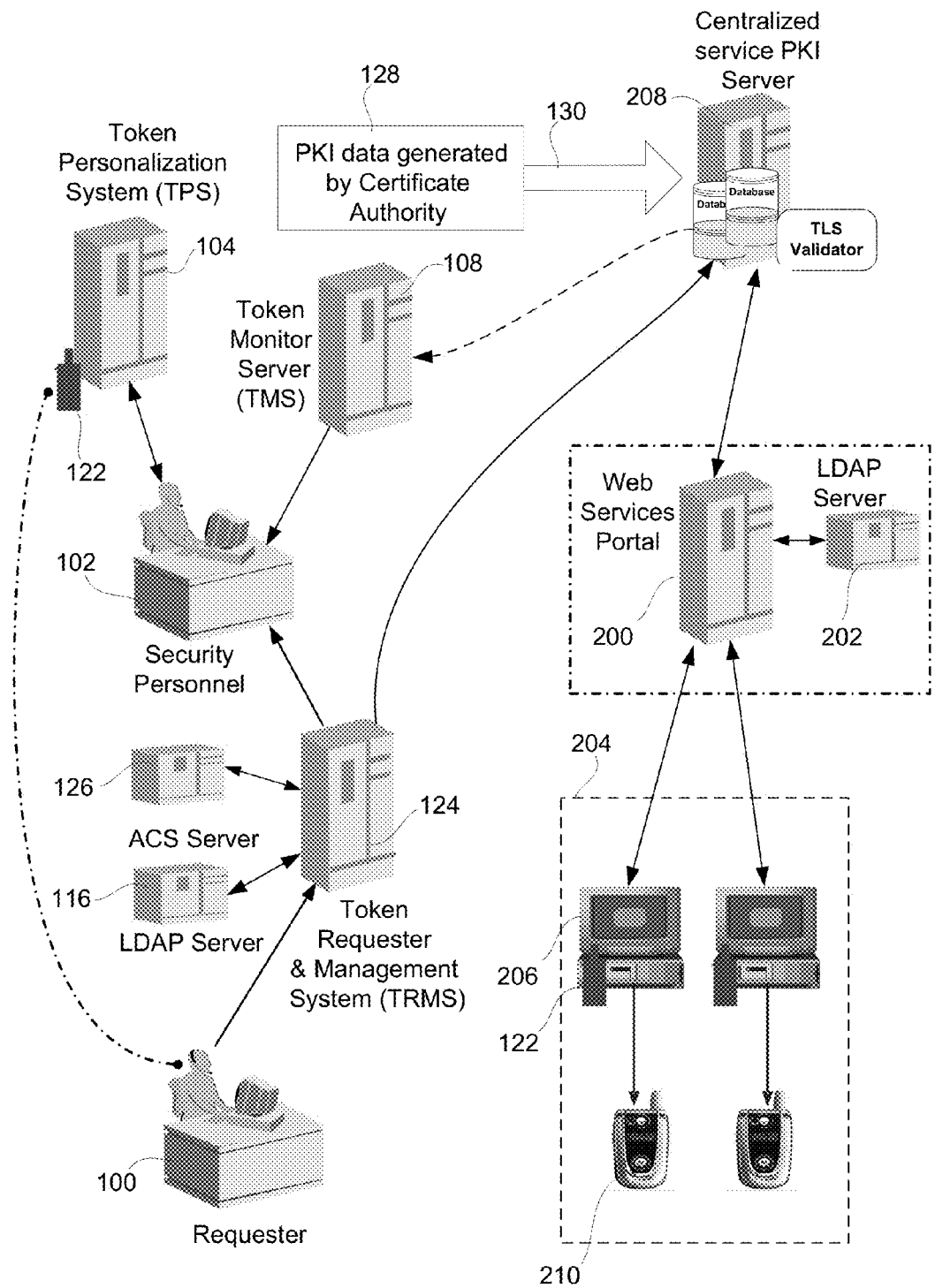
FIG. 2 is a diagram showing an illustrative hardware token-based PKI system for repair service processes, according to one embodiment of principles described herein.

FIG. 2 is an illustrative diagram showing one exemplary embodiment of a token-based PKI system for service processes. The token-based PKI system utilized for service centers (204) can be similar to that used in manufacturing settings. However, service centers (204) are typically smaller and more numerous than factories. In many cases, it may not be cost effective to maintain a local PKI server within each service center.

According to one exemplary embodiment, the service center workstations (206) are paired with hardware tokens (122) that enable the workstation (206) to communicate with a centralized PKI server (208) via a web services portal (200). The web services portal (200) may communicate with an LDAP server (202) to authenticate user names, passwords, or other data associated with each service center.

After the basic authentication is completed, the web service portal (200) initializes a two-way TLS communication with the centralized PKI server (208) and forwards the PKI data request message signed by a station's token (122) to the PKI server (208). The PKI server (208) first validates the Web Service Portal (200) TLS client request, and then validates the PKI data download request message generated by the station (206). The PKI server (208) then generates a response message with the requested PKI data included.

Figure 3:
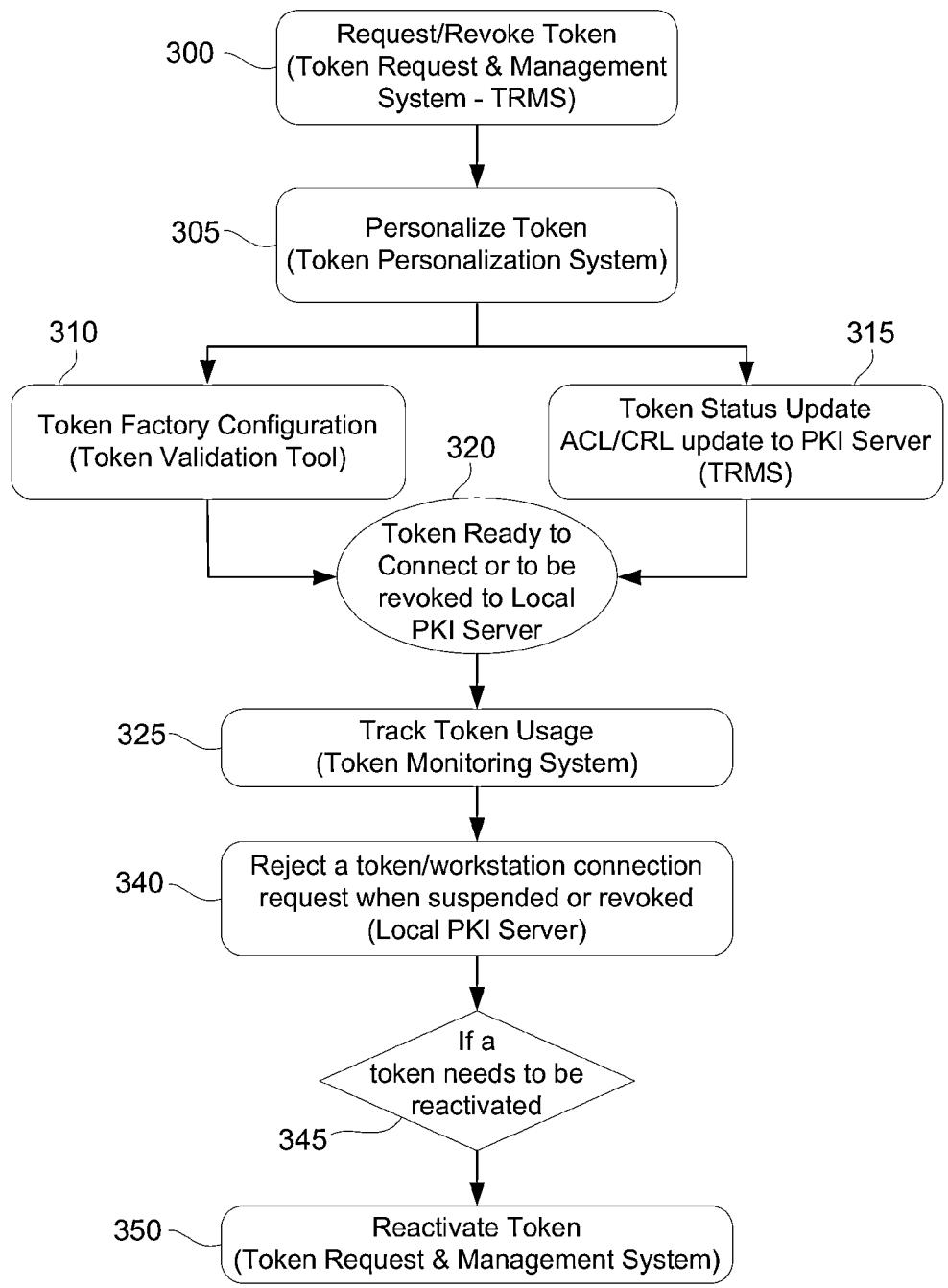
FIG. 3 is a diagram showing an illustrative hardware token-based PKI system process flow, according to one embodiment of principles described herein.

FIG. 3 is a flowchart showing one illustrative embodiment of a token-based PKI system process workflow. FIG. 3 presents an overview of the token-based PKI system process workflow and introduces each element. The various elements are described in greater detail in later figures.

In a first step, the user communicates a request for a token or request for the revocation of a token to the Token Request and Management System (TRMS) (step 300). The token request and management system (124; FIG. 1) then sends the token request to the token personalization system (104; FIG. 1) (step 305). The token requests may be transferred from the token request management system (124; FIG. 1) to the token personalization system (104; FIG. 1) in a variety of ways. By way of example and not limitation, a message may be sent automatically to the token personalization system (104; FIG. 1).

Alternatively, the process may be configured such that a request may require manual intervention by a human operator as shown in FIGS. 1 and 2. Interposing a human operator in the communication path may allow for an additional means of verifying the request submitted by the user (100; FIG. 1). By way of example and not limitation, the human operator may be security personnel (102; FIG. 1). The security personnel may receive an e-mail notifying them that a token request has been made. In response to the e-mail, they may manually transfer the request from the token request and management system (124; FIG. 1) to the token personalization system (104; FIG. 1). In an alternative embodiment, the security personnel may simply click a button to authorize the automated transfer of the request information from the TRMS (124; FIG. 1) to the TPS (104; FIG. 1). The TPS (104; FIG. 1) then processes the request and personalizes one or more tokens or generates a certificate/token revocation request.

If the request was for the generation of one or more hardware tokens, the hardware tokens are personalized and shipped to the requesting party. The requesting party receives the tokens and verifies the correct installation of the tokens (122; FIG. 1) using a token validation tool (step 310). In some instances, a requesting party could receive hundreds of tokens at the same time. The token validation tool is used to ensure that a token is installed into the correct workstation.

For a token (122; FIG. 1) to connect to the PKI server, it must be included in the access control list (ACL). The ACL is maintained on the factory/service center PKI server(s) (110; FIG. 1). The ACL list is updated by the token request and management system (124; FIG. 1) after a token request is processed (step 315). Following the successful installation of the token (122; FIG. 1) into the factory workstation (114; FIG. 1) and the update of the PKI server ACL, the system is configured to allow the token (122; FIG.1) to connect to the PKI server (110; FIG. 1) (step 320). The usage of that particular token is then monitored (step 325). If the token (122; FIG. 1) is not used for an extended period of time, the token (122; FIG. 1) is suspended (step 340). If the token (122; FIG. 1) needs to be reactivated (step 345), a reactivation procedure is followed. At the conclusion of the reactivation process by the TRMS, the token (122; FIG. 1) is reactivated and be can be used to download PKI data from the PKI server (110; FIG. 1) (step 350).

If the request was for the revocation of a hardware token, TPS (104; FIG. 1) generates a new certificate revocation list (CRL) that includes the revoked token's information. After the CRL is transmitted to the TRMS (124; FIG. 1), the TRMS sends the updated CRL to the PKI server (110, FIG. 1) to which the revoked token connects. The PKI server (110, FIG. 1) will then reject requests for downloading PKI data by the revoked token.

Figure 4:
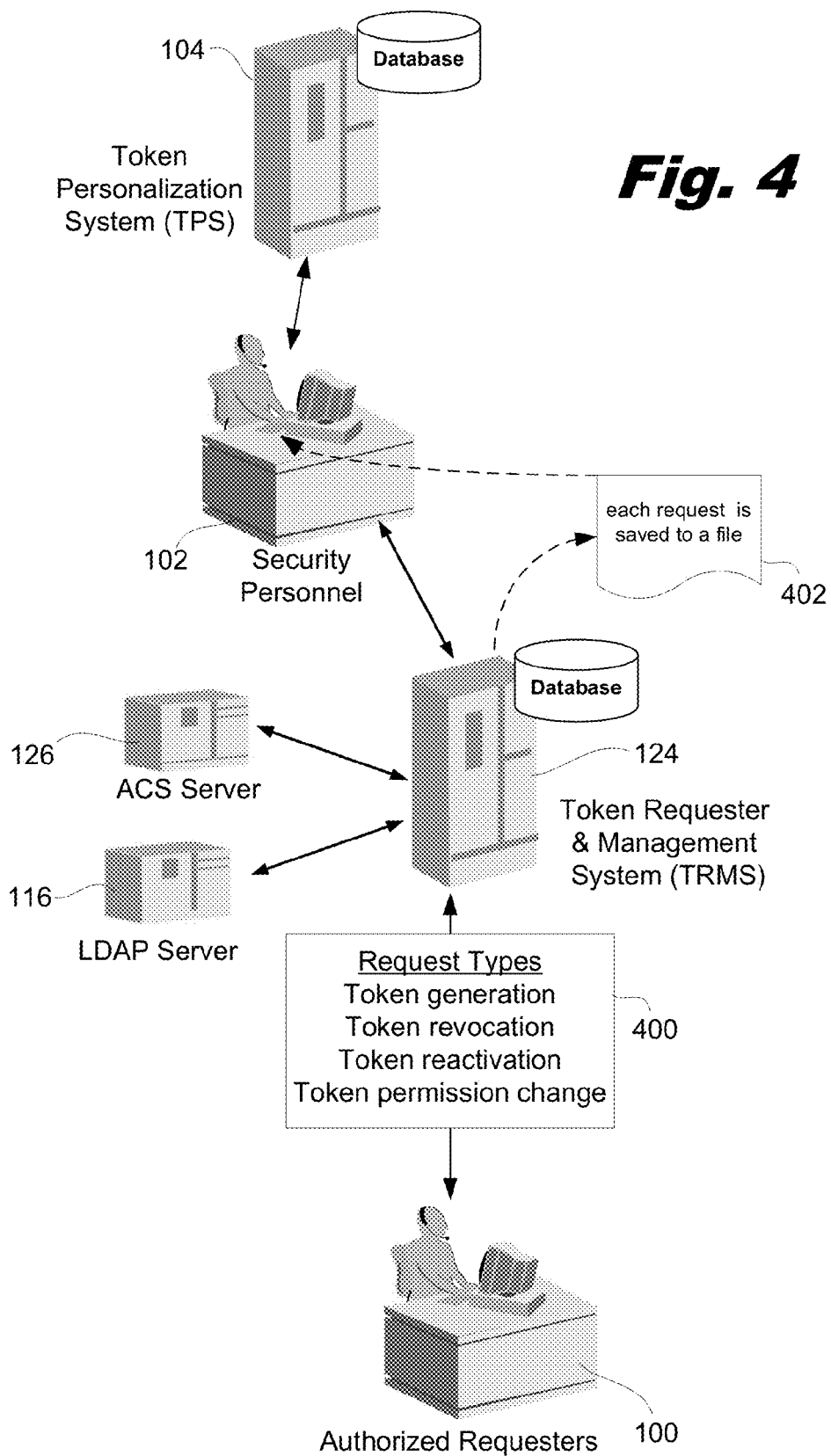
FIG. 4 is a diagram showing an illustrative method for making hardware token requests and managing those requests, according to one embodiment of principles described herein.

FIG. 4 is an illustrative diagram showing one exemplary method for making token requests (400) and managing those requests. According to one exemplary embodiment, the authorized requesters (100) log onto the TRMS (124) using a SecurID® username and/or login password via a web interface. A SecurID® is a software or hardware device assigned to each user that generates a new authentication code at fixed intervals (i.e., every thirty to sixty seconds). The authentication code is different for each user. The user logging onto a network resource (in this case, the TRMS), needs to enter both a password and the number being displayed at that moment on the SecurID® device.

A variety of requests relating to the token-based PKI system can be made including: submitting a single or a batch token request, submitting the token revocation request, submitting a token reactivation request, or a request to view/change token status. According to one exemplary embodiment, a web graphics user interface (GUI) could be used to simplify the process of making a request for both internal and external users (e.g., user 100). The web GUI could use information gathered or already known to facilitate the entry of information by the user. GUI may only present options to users/requesters for which they are authorized based on the identity of the users/requesters. For example, only those PKI servers and PKI data types that are authorized to that specific user/requester would be listed as options for him/her to select. The GUI interface could also allow a user/requester to submit a batch token generation request for multiple tokens to be personalized for their workstations.

To submit a single or batch token request, the following information may be required: a workstation unique ID, other information related to the client workstation on which the token is going to be installed, the PKI server that the token needs to be authorized to access, and the PKI data types the token will be used to download. By way of example and not limitation, the workstation unique ID may include an IP address, a fully qualified domain name, hostname, or other unique identifier. Other information may also be required that identifies the workstation into which the token is going to be installed. This information may include the location of the workstation, a bench number, computer name, etc. Information relating to which servers a token will authorize access can also be included in the request information. According to one illustrative embodiment, the information about the workstation that may be required to generate a hardware token key/certificate could include: the static IP address, host name, the product name, the data center site name, and the company or affiliation name.

Using this information, a globally unique workstation identifier can be created. By way of example and not limitation the globally unique workstation identifier for a data center workstation may consist of the following combination: "IP address/hostname/fully qualified domain name (FQDN)+product name+factory/service center site name+company/affiliation name." A FQDN is an unambiguous domain name that specifies a node's position on the domain name system (DNS) hierarchy absolutely. The workstation identifying information contained in the certificate, such as the IP address/host name/FQDN, binds the hardware key (122) to a specific workstation (114). The information that is entered can be used to later generate the token certificate or be otherwise utilized by the PKI data system to improve the control and security of the PKI data.

To submit a batch token request, it may be cumbersome to type in each of the individual IP addresses or other identifying information of all the workstations. To facilitate the process of making a batch token request, the requester (100) may select or enter a starting IP address and an ending IP address. The TRMS (124) can then extract the workstation identifiers within the range supplied and create a list of IP addresses and corresponding information to be submitted in the batch request. Alternatively, the requester (100) could simply submit a starting IP address or other identifying information and the number of workstations (114) for which a token is required for particular factory configuration. The TRMS could then generate the appropriate subsequent workstation identifiers.

The token request may also include which PKI server the token will be authorized to access. By limiting the token to specific PKI servers, the potential for misuse of the token is reduced. The PKI servers may be selected in a variety of ways. By way of example and not limitation, the request interface may include a server list that contains all the servers a particular requester is authorized to access. From this list, the requester could select the desired PKI server for that specific workstation/token to access.

According to one exemplary embodiment, the requester (100) may also enter the type of PKI data that the token (122) will authorize the workstation (114) to download from the PKI server (110). Various products use different types of PKI data. By limiting the kinds of PKI data the token can be used to access, the potential misuse of the token can be limited to a single product or product version for which the token is requested. For example, in a factory there may be several manufacturing lines, each of which are specially adapted to configure/personalize a specific product. The tokens attached to workstations used on a first line would only be authorized to download the PKI data used for the product being personalized in the first line. Similarly, the tokens attached to workstations used on a second line would be authorized to download only the specific type of PKI data used in a second product.

In addition to token generation requests, token revocation requests, token reactivation requests, and token status requests can be submitted. Information required when submitting a token revocation request or a token reactivation request may include the following information; the unique identifier of the token to be revoked or reactivated and the PKI server that the token is authorized to access. A token permission change request could allow a token requester to change a token permission to different PKI data types. By changing the PKI data type that a token has permission to access, the same token can be adapted for use with a different product. For example, a token is initially authorized to download PKI data type X for a specific product A. Later, the same token/workstation can be used to download PKI data type Y for a different product if a token permission change request is submitted, verified, and put into operation.

The TRMS (124) serves as the interface for making the various token requests (400) and as a repository for those requests. The TRMS (124) receives the requests and attempts to verify the requester and the request using information stored on an LDAP server (116) and/or an ACS server (126). According to one exemplary embodiment, the TRMS (124) independently verifies the information provided by the requester (100) using an access control server (ACS) (026). The ACS (026) is an access policy control platform that can provide user authentication and admission control, authorize commands, provide an audit trail of transactions, and provide other services.

Following successful authentication of the requestor (100) and verification of the request by the TRMS (124), the TRMS (124) sends an e-mail notification to the security personnel (102) that a request has been received for the generation of PKI hardware tokens (122). The TRMS (124) also generates an ACL based on a token identifier and the type of PKI data the token authorizes the workstation (114) to download. This ACL is then pushed by the TRMS (124) to the PKI server (110). After the token (122) is connected to the proper workstation, the workstation can use the token to authorize downloads of the selected PKI data types from the PKI server (110).

Figure 5:
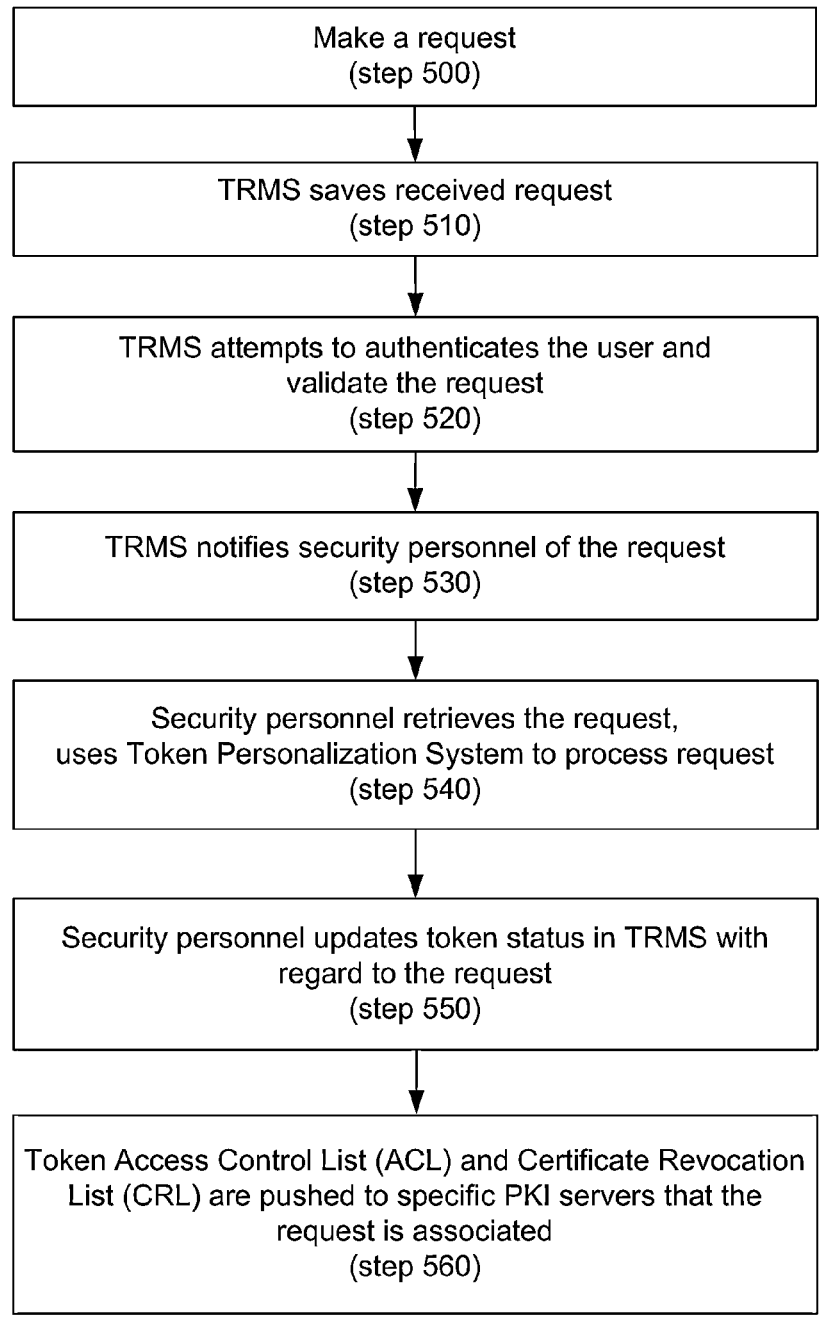
FIG. 5 is a diagram of an illustrative workflow for token requests, according to one embodiment of principles described herein.

FIG. 5 is an illustrative diagram of one exemplary method for a token request workflow. A request is initially made through the TRMS (step 500). Typically, this request will be made via a web-based interface. The TRMS receives the request and saves the request (step 510) to its database. The TRMS may then verify the request information in order to authenticate the user and validate the request (step 520). This may be accomplished in a variety of ways, including accessing an ACS server, an LDAP server, or other techniques. The TRMS, after attempting to authenticate the user and validate the request, may send an email or other notification to the security personnel (step 530). The security personnel retrieve the request file and use the TPS to process the request (step 540). Security personnel then update the token status in the TRMS to reflect the request status change (step 550). The token ACL and certificate revocation list (CRL) are pushed to the specific PKI servers with which the request is associated (step 560).

Figure 6:
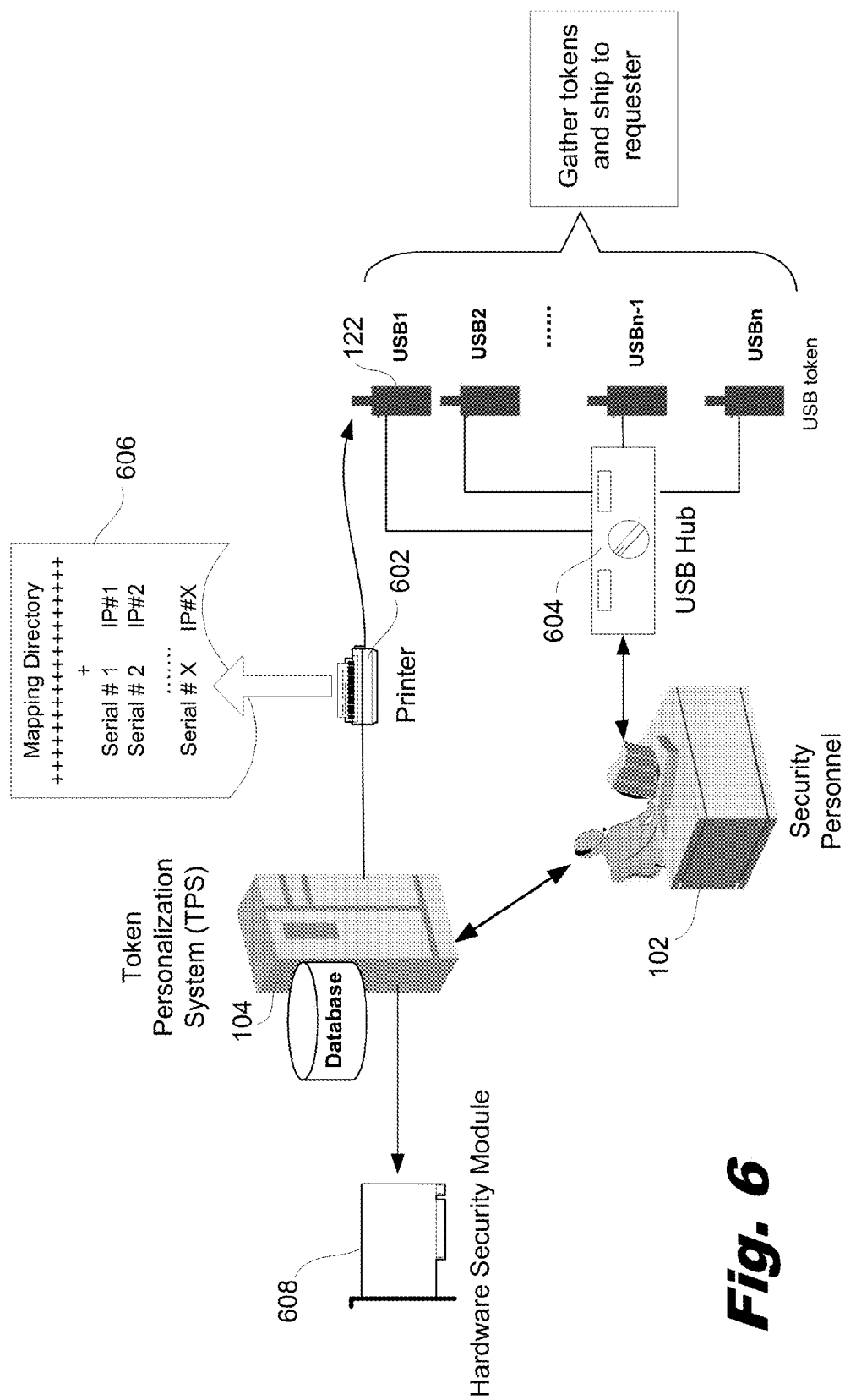
FIG. 6 is a diagram showing an illustrative process for token personalization, according to one embodiment of principles described herein.

FIG. 6 is a diagram showing one illustrative method for token personalization/generation. The TPS (104) operation is initiated by security personnel (102) after receiving an e-mail notification or other notification from the TRMS (124; FIG. 4) of a pending request for hardware tokens or hardware security modules (HSM). According to one exemplary embodiment, the e-mail notification conveys to the security personnel (102) that a hardware token request or other request has been made and saved to a file. The security personnel (102) then retrieve the file and manually transfer the PKI request file to the TPS (104). A web-based GUI may assist the security personnel (102) in extracting the desired data from the TRMS file (402, FIG. 4). In an alternative implementation, the TPS is directly connected to the TRMS (124; FIG. 4) and receives the request but does not process it. The security personnel simply approve the request after receiving the email notification. After security personnel's approval, TPS processes the request.

The security personnel (102) then use the information to personalize the tokens (122). As previously mentioned, the hardware tokens (122) may be personalized with key pair, token certificate, PKI information, and other data. In one exemplary embodiment, the hardware tokens are USB compatible and can be personalized in batches using a USB hub (604). Where only one or two USB tokens are being personalized, they can be plugged directly into a computer for personalization. Following the personalization of the USB tokens (122), a printer (602) could be used to print a mapping directory (606). The mapping directory (606) may comprise a serial number or other identifying information associated with the USB tokens (122) and the IP address or other identifier of the workstation to which the specific USB token (122) is to be attached. The serial number or other token identifier (122) could be printed or engraved on the exterior of a token. The mapping directory is sent with the tokens to be used as a reference during the installation of the tokens where they are deployed.

The TPS (104) may also be used to personalize other types of security devices, including hardware security modules (608). Hardware security modules (608) can take a variety of forms, including PCI cards that are placed within the PKI server. Hardware security modules (608) can be used to securely generate and/or store long-term secrets/keys for use in cryptography and to physically protect access to those secrets over time. Most hardware security modules (608) are also hardware cryptographic accelerators.

After the personalization process is complete, an optional validation process could be used to verify that the tokens were legitimately requested and contain the correct personalization information. According to one exemplary embodiment, the validation process is performed by an independent human operator that was not previously involved in the request and personalization process.

Following the personalization of the USB keys (122) and/or hardware security module (608), the personalized equipment and mapping directory (606) are gathered, checked, and packaged. The package is then sent back to the requesters (e.g., user 100) or to a location designated by the requesters. For example, the package may be shipped by any conventional means to the personalization facility (112), including express or priority mail, or by any number of other services that provide expedited and tracked delivery of packages.

Figure 7:
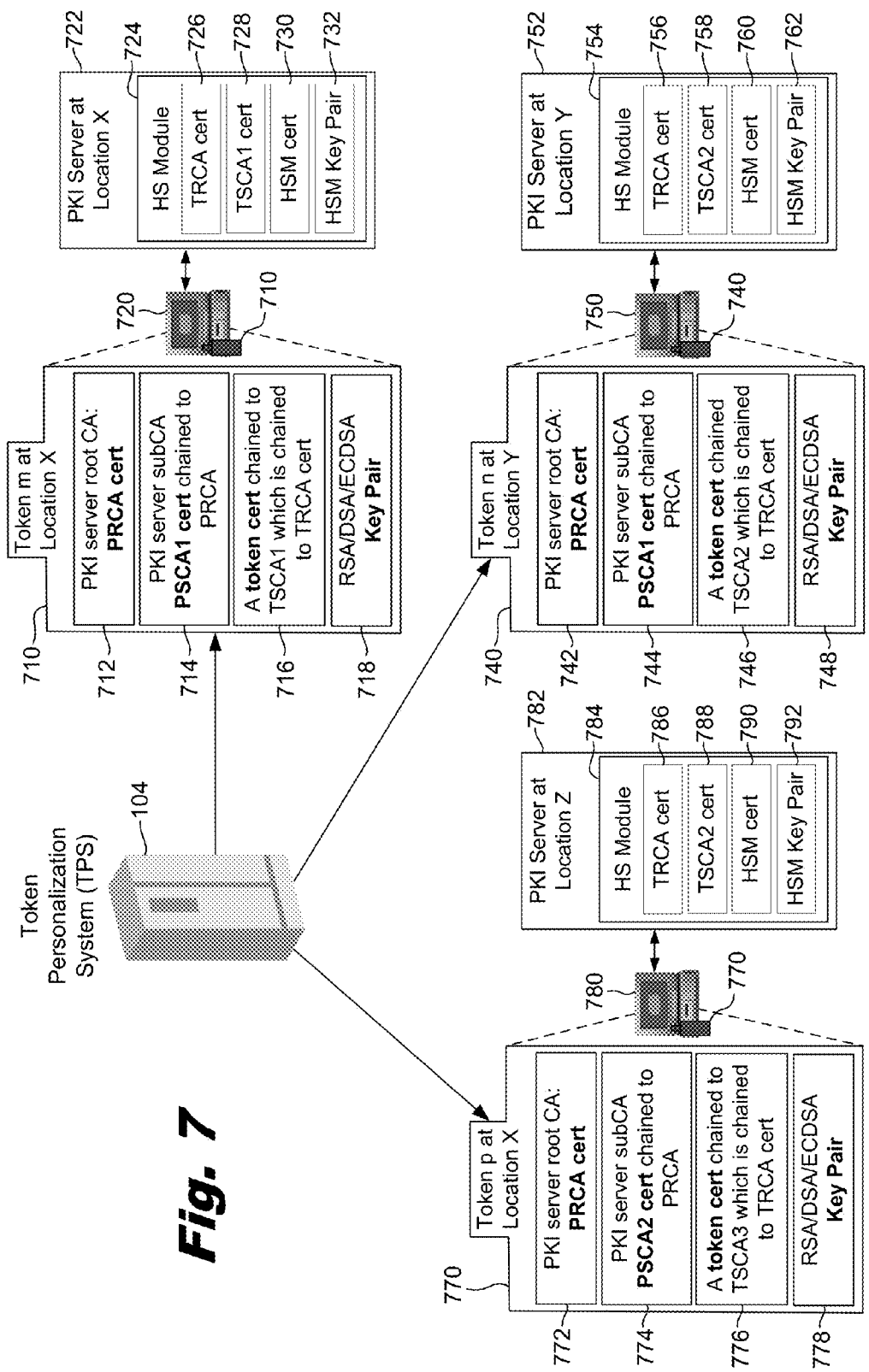
FIG. 7 is a flowchart showing an illustrative embodiment of personalization data contained within hardware tokens and PKI servers, according to one embodiment of principles described herein.

FIG. 7 shows an illustrative diagram of personalization data contained on various tokens (710, 740, 770), according to one exemplary embodiment. The tokens (710, 740, 770) are associated with workstations (720, 750, 780) and the hardware security modules (724, 754, 784) that are contained within PKI servers (722, 752, 782). According to one exemplary embodiment, the TPS (104) transfers a PKI server root certificate authority (712, 742, 772) labeled "PRCA cert" into nonvolatile memory located within the hardware token. The PKI server root certificate authority (712, 742, 772) is used by a workstation to authenticate the PKI server when performing TLS operations. The TPS (104) also loads a PKI server sub-certificate authority (714, 744, 774) which is labeled "PSCA1" or "PSCA2" to the token. The PKI server sub certificate authorities (714, 744, 774) are chained to the PKI server root certificate authority (712, 742, 772). A token certificate (716, 746, 776) and key pair (718, 748, 778) are also loaded onto the tokens (710, 740, 770). In one alternative embodiment, the key pair (718, 748, 778) is generated by the token itself and is not required to be generated or transferred by the TPS (104). The token certificate is issued under Token Sub-CA (TSCA), which in turn is chained to a Token Root CA (TRCA). Both TSCA and TRCA are loaded onto the HSM of the PKI server in order for the server to authenticate the token. According to one exemplary embodiment, each token certificate is chained to a token sub-certificate authority which in turn is chained to a token root certificate authority.

As shown above, certificate authorities (CAs) are another important component in a hardware token-based TLS system. In one exemplary embodiment, the same hardware token key/certificate will be used for TLS protocols to provide secure connection between a server and a workstation, for signing functions, and to provide message authentication. In this embodiment, the hardware token has only one key pair with one certificate for all functions. According to another exemplary embodiment, different keys/certificates could be used for TLS and signing functions. A central "root" CA could be used, with one or several "sub" CAs, one for each deployment location, under the same central "root" CA being used for token initialization. Each factory PKI server could have its corresponding sub CA certificate along with the root CA certificate installed so all the security messages (such as TLS messages and other application signing messages) generated by tokens connected to this server can be authenticated.

The PKI server certificates are chained to PKI server sub-certificates, which in turn are chained to a PKI root server certificate authority. The Sub CA and the root CA are loaded to PKI servers' HSMs so a PKI server can authenticate the token.

The personalization and data loaded onto the hardware security modules (724, 754, 784) contained within the PKI servers (722, 752, 782) can include matching token root certificate authorities "TRCA cert" (726, 756, 786) and token sub certificate authorities (728, 758, 788) that match the respective token certificates contained within the tokens (710, 740, 770). These two certificates are used to authenticate tokens when performing TLS operations. Hardware security modules (724, 754, 784) also contain their own certificates labeled as "HSM cert" (730, 760, 790) and hardware security key pairs (732, 762, 792). According to one embodiment, the private key is used to sign a message. The certificate is attached so that the receiving party can extract the public key from the cert to verify the message.

The hardware security module key pair (732, 762, 792) and the token key pair (718, 748, 778) typically are comprised of a public/private key pair. The public/private key pair may be generated by a variety of algorithms including the Rivest/Shamir/Adleman (RSA) algorithm, Digital Signature Algorithm (DSA), or Elliptic Curve Digital Signal Algorithm (ECDSA). The private key is kept secret, while the public key is widely distributed. A message encrypted with the public key can only be decrypted with the corresponding private key. A messaging encrypted with a recipient's public key cannot be decrypted by anyone except for the recipient who possesses the corresponding private key. Encryption ensures the confidentiality of the message.

The public and private key pair can be generated using at least two options. In the first option a key pair could be generated using a third party entity (e.g. ALADDIN™ token initialization). The public key could then be extracted from the token and loaded onto the TPS (104) which would be used to generate certificates and return the certificates to the hardware token (212). A second option includes creating both the key pair and certificates within TPS (104), and then loading the private key and certificates onto the hardware token (212).

A digital signature can be created by signing a message with a sender's private key which can then be verified by anyone who has access to the sender's public key, thereby proving the sender signed it and that the message has not been tampered with. The digital signature is used to ensure authenticity and evidence of origin of the message.

Figure 8:
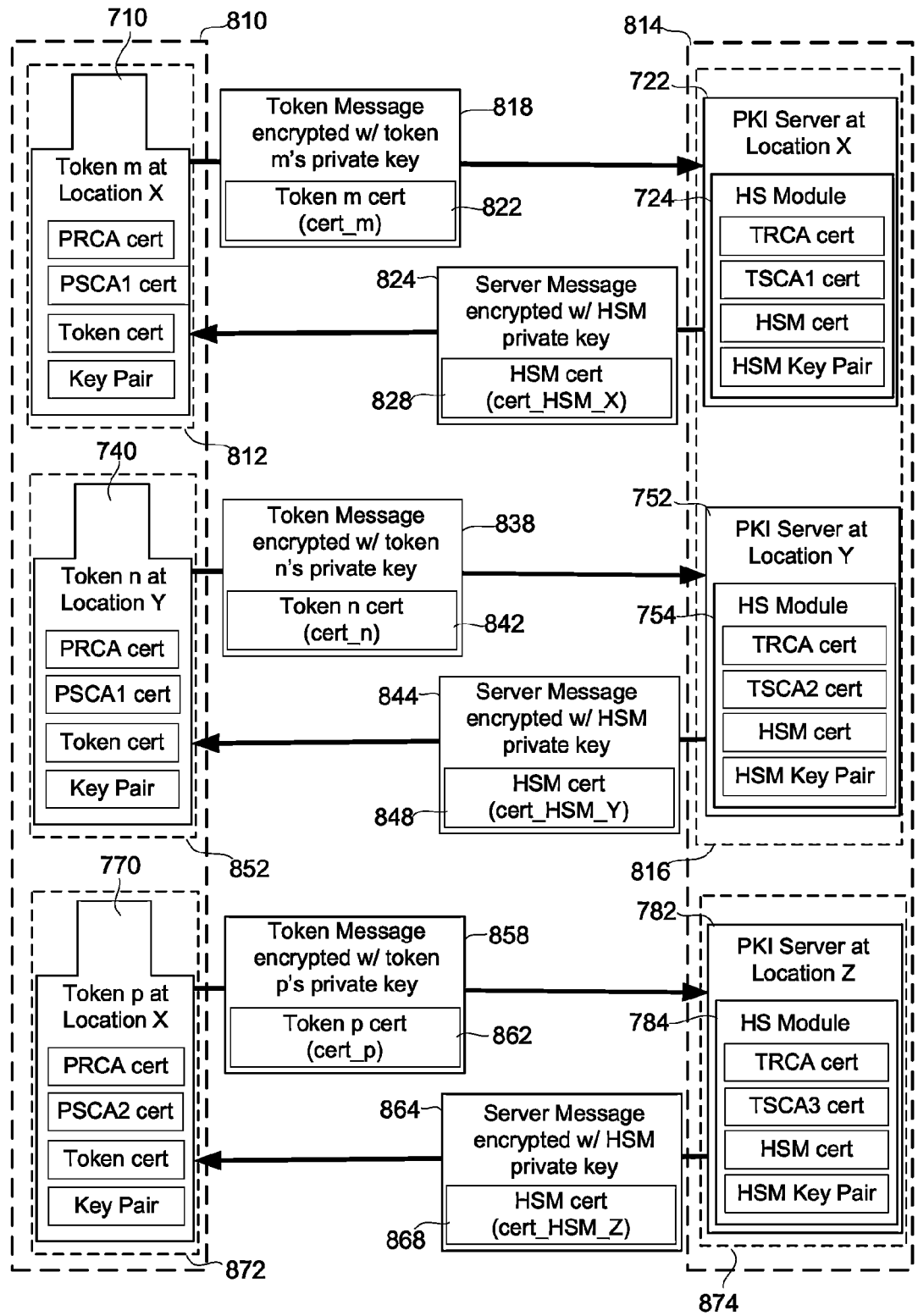
FIG. 8 is a diagram showing an illustrative method for passing secure messages and trust chains used for authentication transactions between hardware tokens and PKI servers, according to one embodiment of principles described herein.

FIG. 8 shows one illustrative method of using the keys and certificates associated with different trust/PKI chains to secure message exchanges between the PKI servers (722, 752, 782) and the workstations that contain hardware tokens (710, 740, 770). The trust/PKI chains are based on data deposited on tokens and their respective servers during the personalization process. All the tokens/workstations (710, 740, 770) that are connected to a group of PKI servers (722, 752, 782) belong to a trust domain that is defined by the certificate authority. For example, token m at location X (710) belongs to the trust domain of the token sub certificate authority TSCA1 (812). The token sub-certificate authority TSCA1 (812) is chained to the token root certificate authority (810). The token root certificate authority (810) is an umbrella trust domain that may include a number of token sub-certificate authorities. For example, the token certificate contained within token n at location Y (740) is chained to a token sub-certificate authority TSCA2 (852) which, in turn, is chained to the token root certificate authority (810). Similarly, the token certificate contained within token p at location X (770) is chained to the token sub certificate authority TSCA3 (872) which, in turn, is chained to the token root certificate authority (810). According to one exemplary embodiment, the token trust domains are location-based, with each token residing in a different location (i.e. attached to a different workstation).

The PKI servers (722, 752, 782) and the hardware security modules (724, 754, 784) contained within the PKI servers are also contained within a single root domain. For example, the PKI server at location X (722) belongs to the trust domain under the PKI server sub-certificate authority PSCA1 (816), which is chained to the PKI root server authority PRCA (814). According to one exemplary embodiment, the PKI server at location Y (752) also belongs to the trust domain under the PKI sub certificate authority PSCA1 (816). The third PKI server at location Z (782) belongs to a PKI sub certificate authority PSCA2 (874) which is, in turn, chained to the PKI root server Authority PRCA (814). According to one embodiment, the PKI domains need not be location-based but can be application based or product based. By way of example and not limitation, a trust domain associated with the first and second PKI servers (722, 752) may be associated with a single product, such as a certain mobile phone model. The third PKI server at location Z (782) may be associated with a different product line, such as set top boxes.

Figure 9:
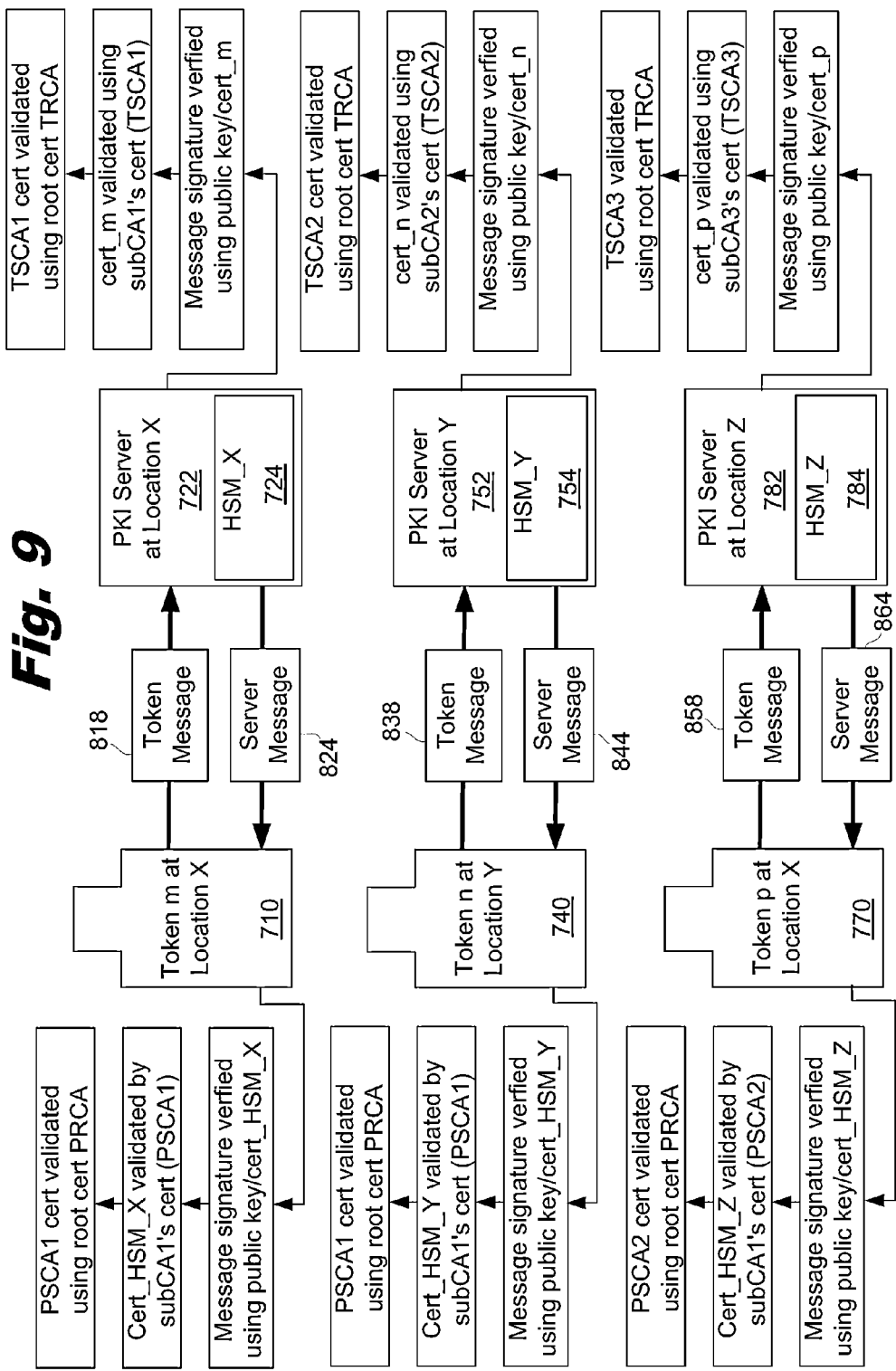
FIG. 9 is a diagram showing one illustrative method for verifying the authenticity and origin of messages passed between hardware tokens and PKI servers, according to one embodiment of principles described herein.

FIG. 9 is a diagram illustrating one exemplary message and certificate validation between tokens (710, 740, 770) and the PKI servers (722, 752, 782) using the keys/CA certificates. The tokens (710, 740, 770) are paired with one or more matching PKI servers (722, 752, 782) during the personalization process. When token m (710) requests information from a PKI server (722), token m (710) sends a message (818) signed with token m's private key along with token m's certificate (822, FIG. 8). The PKI server (722) authenticates token m's certificate (822, FIG. 8) using the certificates of token m's sub-certificate authority and root certificate authority which are embedded inside the hardware security module (HSM) (724) within the PKI server (722). Token m's public key is then extracted from the token certificate to verify the message. The PKI server (722) then responds with a server message (824) signed with the PKI server X's private key which is embedded inside the PKI server's HSM (724) along with the server's certificate (828). The token m (710) authenticates the PKI server's certificate using the certificates of the PKI server's sub-certificate authority and root certificate authority which are embedded inside the token m (710). The server's public key is extracted from the server certificate to verify the message. Similarly, messages (838, 858) can be sent from the respective tokens (740, 770), signed with tokens' private keys, along with the respective tokens' certificates (842, 862) to the PKI servers (752, 782). The other PKI servers (752, 782) respond by returning messages (844, 864) signed with the servers' private keys. The messages (844, 864) include the hardware security modules certificates (848, 868).

Figure 10:
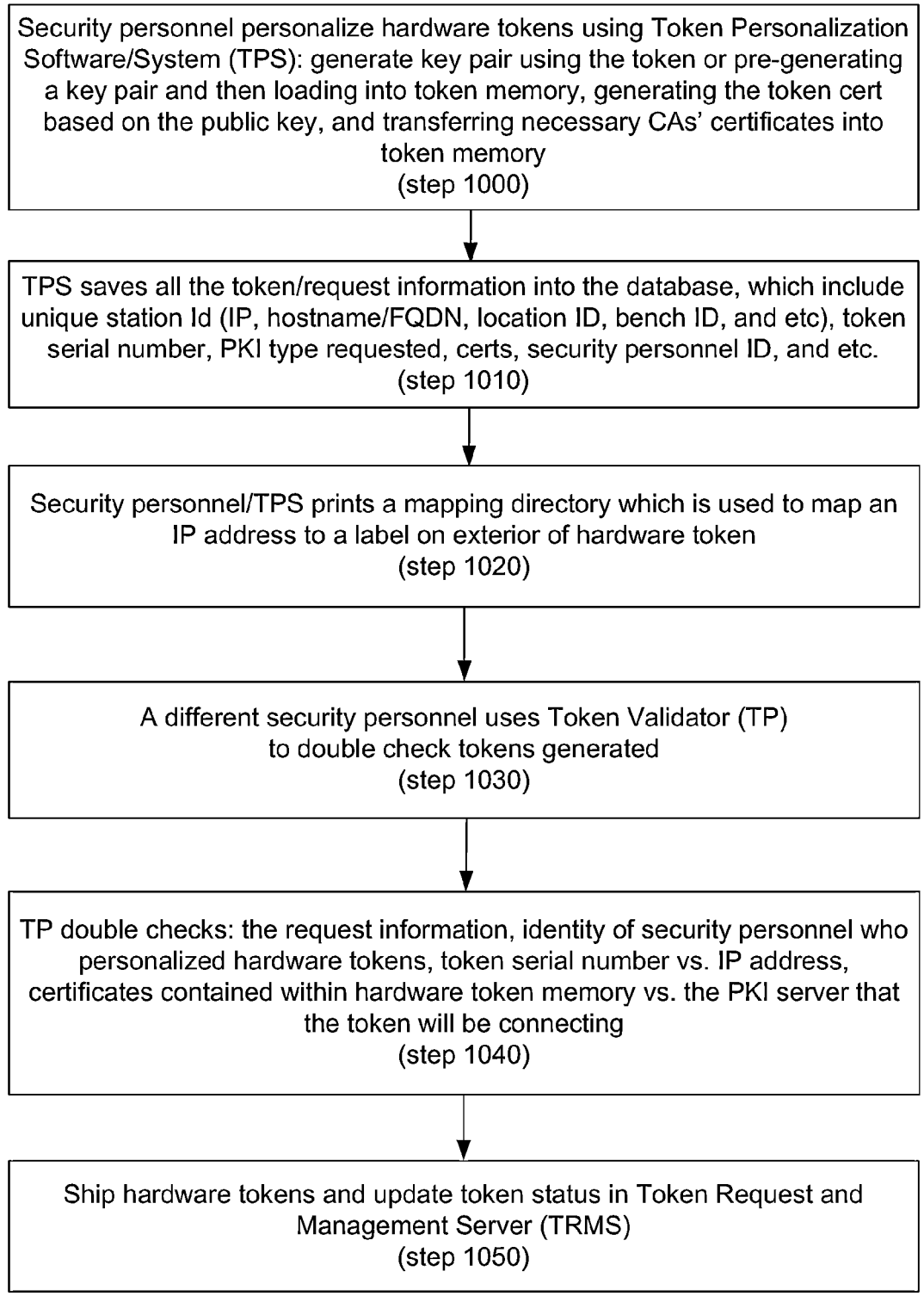
FIG. 10 is a flowchart showing one illustrative method for monitoring token personalization workflow, according to one embodiment of principles described herein.

FIG. 10 is an illustrative flow chart showing one exemplary method for generating and validating hardware tokens. Following a successful verification of a request, the security personnel/TPS personalize the hardware tokens (122; FIG. 1) by transferring PKI data into the hardware token memory (step 1000). The personalization process may include generating a key pair using the token or pre-generating a key pair and unloading the data onto token memory. A token certificate is also generated based on the public key and may contain any other information that is deemed important. This information may include the two other certificates used to authenticate with the PKI server when performing TLS operations. This PKI data is then transferred into nonvolatile token memory.

The token personalization system saves all the token/request information into the database. This information may include unique station ID, token serial number, PKI type requested, certificates, security personnel identifiers, and other relevant data (step 1010). The unique station ID may include any identifier connected with the particular workstation including an IP address, hostname, a fully qualified domain name, a location identifier, a bench identifier, or other information.

Security personnel then print mapping directory (606; FIG. 6) (step 1020). Alternatively, the security personnel could send the mapping directory electronically to designated recipients. The mapping directory (606; FIG. 6) may include an IP address of client workstations and corresponding serial number or other identifier for the matching hardware tokens (122; FIG. 1). At this point, the hardware token is personalized and an optional verification process can begin. A validator, which is typically a member of the security personnel who was not involved with the request or generation process, logs onto the TPS and is authenticated (step 1030). The validator may then use a token validator tool to access the request information and verify the validity of the request and the identity of the security personnel who personalized the hardware tokens (step 1040). By way of example and not limitation, the token validator could double-check the request information, the identity of security personnel who personalized the hardware tokens, token serial number versus IP addresses, certificates contained within the hardware token memory versus the PKI server to which the token/workstation will be connecting.

Following the successful validation of the hardware token personalization, the hardware tokens are gathered and shipped to the appropriate requester or other designated location. The token status in the token request management server (TRMS) is updated (step 1050).

Figure 11:
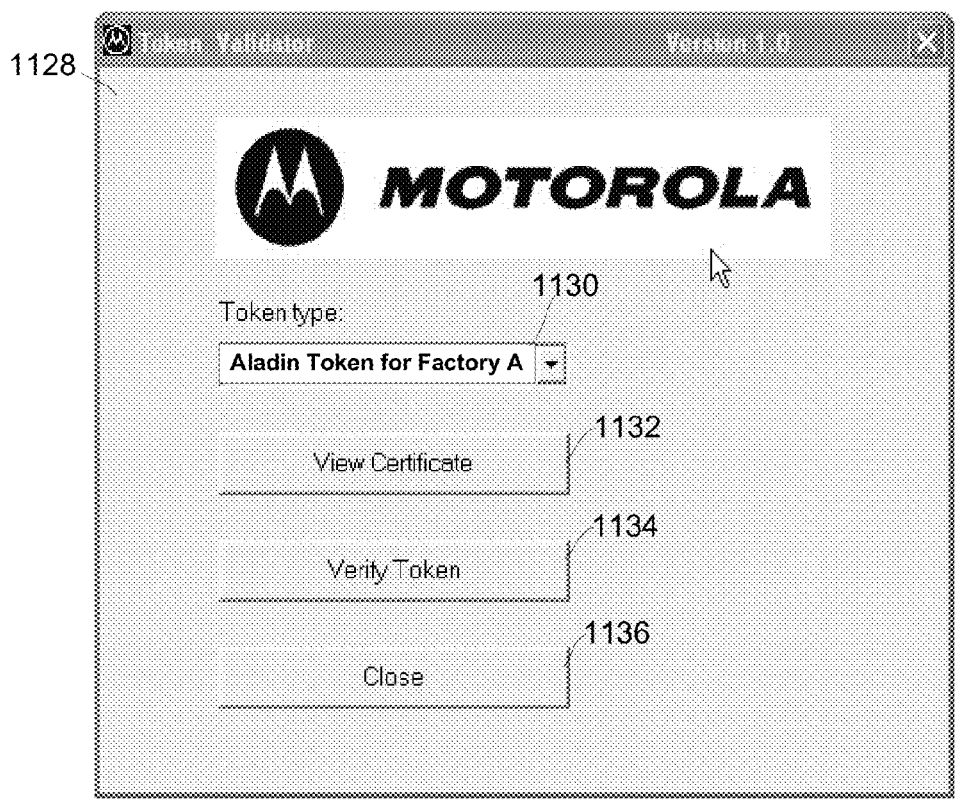
FIG. 11 depicts a screenshot of an illustrative token validation tool, according to one embodiment of principles described herein.

FIG. 11 shows one illustrative embodiment of a token validator tool (1128). As mentioned above, the token validator tool (1128) can be used for batch installation at a factory or for validation of token contents. The token validator tool (1128) could be used by field engineers, manufacturing personnel, programming staff, and service center staff to view the token certificate content from any workstation and to verify that the correct hardware token is installed and bound with the correct workstation. This token validator tool (1128) can be extremely useful when a factory receives hundreds of tokens and needs to install these tokens in the corresponding workstations. The process of checking to determine if a hardware token is installed and bound with the correct workstation could include matching the IP address, fully qualified domain name, or other workstation identifying information with the IP addresses extracted from the certificates or another source. The token validator tool (1128) could be operated on the workstation itself or on a separate machine by matching the same parameters as discussed above. The mapping directory (606; FIG. 6) in either paper or electronic form can also be used as a reference to match the serial number of the token to the workstations IP address or other identifier.

The token validator (1128) may allow the user to select the token type (1130). The token type is specified so that the correct token password embedded within the token validator software can be used to open a session to view the token certificate. Several command buttons (1132, 1134, 1136) may be used to perform various operations within the token validator (1128). By way of example and not limitation, a view certificate button (1132) will allow a user to view information contained within the hardware token certificate, such as the target workstation's identifier. A verified token button (1134) can be used to determine if the token is installed to its target workstation. According to one exemplary embodiment, verify token button (1134) determines if the "common name" field of the "subject name" in the certificate match with the target workstation's identifier. If the "common name" field matches the target workstation's identifier, the token is installed in the correct workstation. A close button (1136) allows the user to terminate the token validator application.

Figure 12:
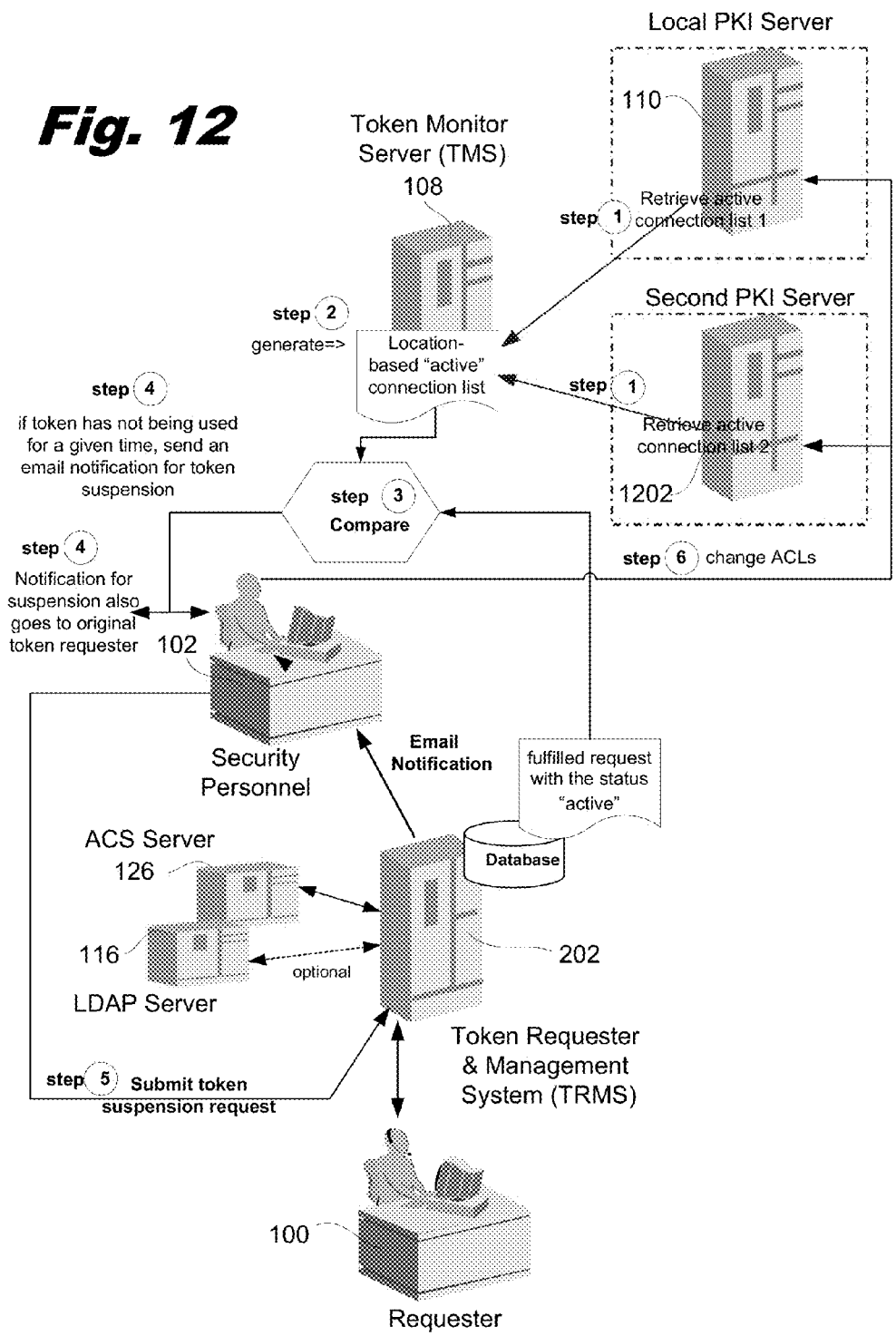
FIG. 12 is a diagram showing an illustrative method for token usage tracking, according to one embodiment of principles described herein.

FIG. 12 illustrates one exemplary method of monitoring the token usage. The usage of the hardware tokens (122, FIG. 1) is monitored by a token monitoring server (TMS) (108). Each PKI server (110, 1202) that is connected to the workstations (114, FIG.1) maintains an access control list (ACL). An ACL includes unique IDs (IP addresses, FQDN, and/or host name) of the workstations that are authorized to download a specific type of PKI data. There can be many ACLs loaded to a PKI server, with each ACL corresponding to a specific PKI type or product line. The PKI server also generates an "active connection list" which contains the unique IDs of the tokens when these tokens make a connection with the server (step 1). The Token Monitor Server (108) then generates a global active connection list by combining all of the individual "active connection lists" from each PKI server in a location (step 2). The global active connection list is then compared to a list of fulfilled requests with a status of "active" generated by the TRMS (202) (step 3). If a token status is active but is missing from the "active connection list" for a certain period of hours/days/weeks, a notification is sent to the original requester (step 4) and the token suspension request is submitted (step 5). The suspension may be made, for example, by the following sub-steps: 1) suspension emails are sent to security personnel as well as the original token requester; 2) security personnel updates the token status from "active" to "suspended" in TRMS; 3) TRMS pushes a new ACL to all the PKI servers at the location. In order to re-activate a suspended token, the original token requester will need to login back to TRMS to submit a re-activation request.

The token revocation process may, for example, include the following sub-steps: 1) an authorized personnel logins TRMS to submit a token revocation request; 2) the request is transferred to TPS by a security personnel after an notification is received, and then is processed by TPS; 3) the security personnel uploads the generated certificate revocation list (CRL) to TRMS. The CRL is also populated to the Token Monitoring System (TMS); 4) TRMS pushes CRL to the targeted PKI servers; 5) the PKI server rejects the connection initiated from a workstation that has a revoked token/certificate; 6) TMS periodically compares the CRL retrieved from the remote PKI servers with the original CRL to make sure that the PKI server uses the exactly same CRL as generated originally to prevent someone from using an older CRL, especially when an older CRL has not expired yet, that allows some revoked tokens to be able to continually make connections to PKI servers.

Figure 13:
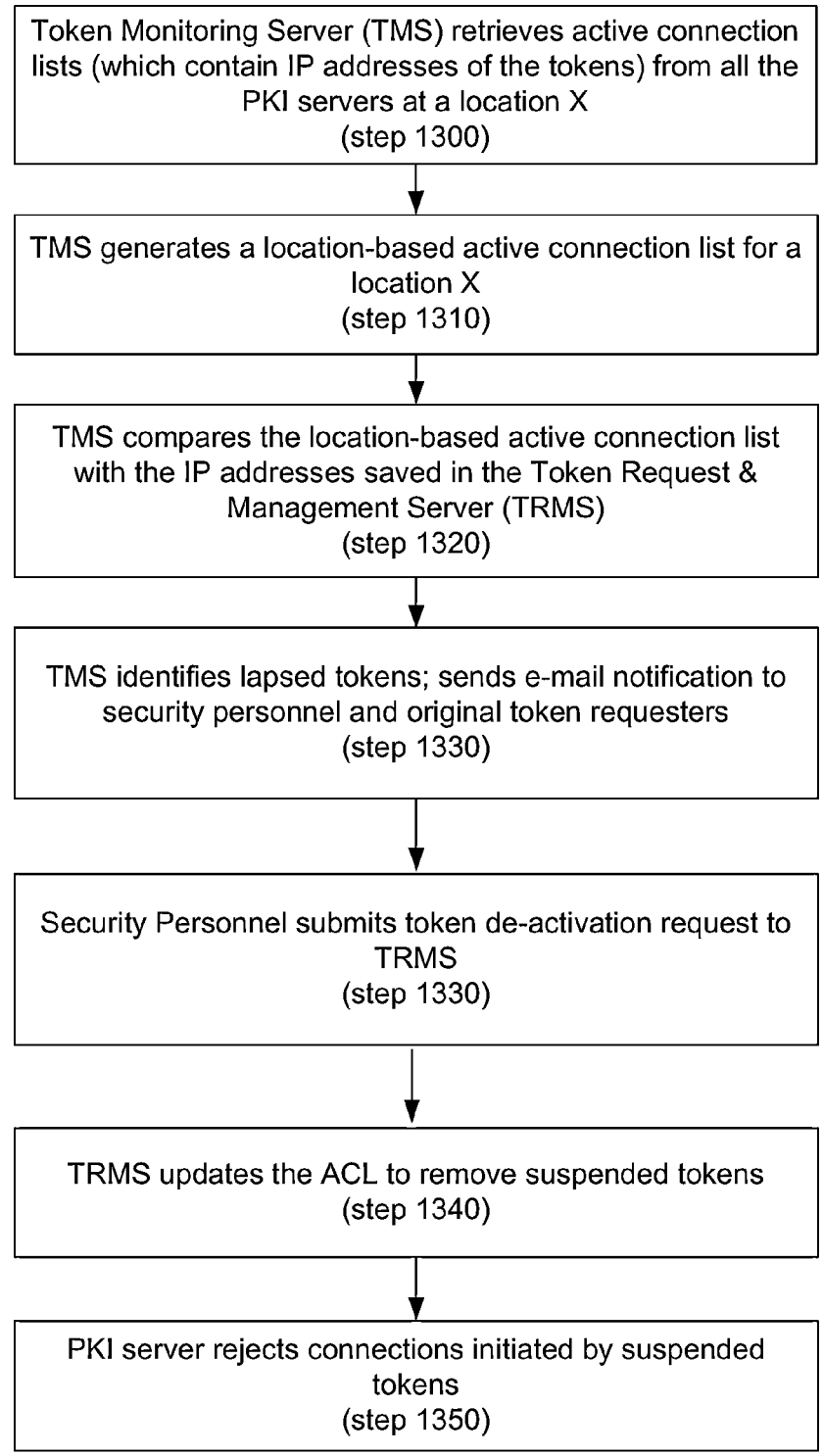
FIG. 13 is a flowchart showing an illustrative method for token usage tracking, according to one embodiment of principles described herein.

FIG. 13 shows one illustrative embodiment of the token usage tracking process in a flowchart form. According to one exemplary embodiment, the TMS (108, FIG. 12) retrieves the active connections lists which contain the IP addresses of the tokens from all the PKI servers in a given location (step 1300). The TMS (108, FIG. 12) then generates a location-based active connection list for that location (step 1310). The TMS then compares the location-based active connection list with the IP addresses saved in the TRMS (202, FIG. 12) (step 1320). The TMS server identifies lapsed tokens and sends an e-mail notification to security personnel and the original token requesters of tokens (step 1330). Security personnel then submit token deactivation requests through the TRMS (202, FIG. 12). The TRMS (202, FIG. 12) updates the access control list (ACL) to remove suspended tokens (step 1340). The PKI servers then reject connections initiated by suspended tokens (step 1350).

Figure 14:
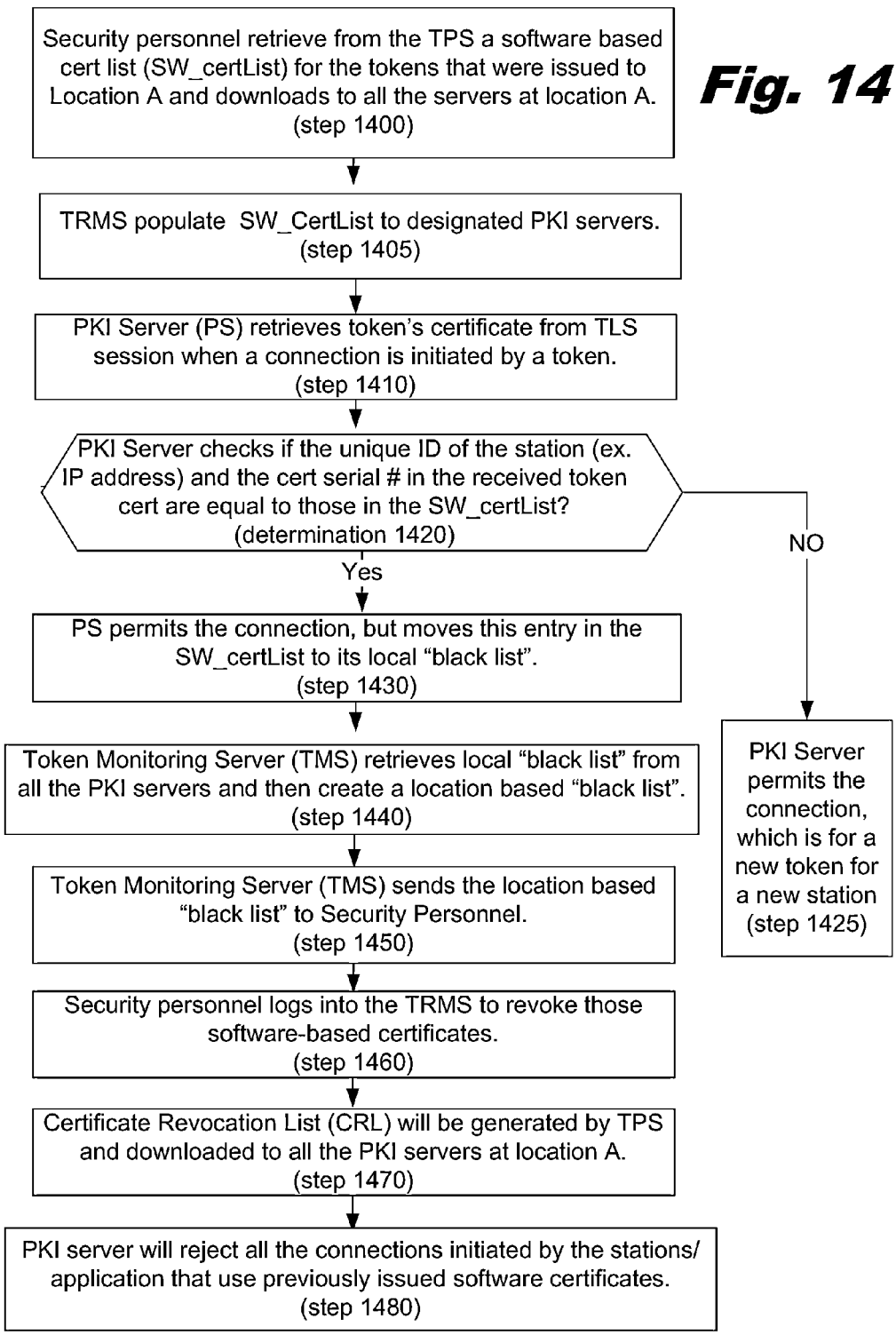
FIG. 14 is a flowchart showing an illustrative method for migration from a software based key/certificate to a hardware token-based key/certificate, according to one embodiment of principles described herein.

FIG. 14 describes one illustrative method of resolving conflicts between software-based keys/certificates and hardware-based token keys/certificates. Several procedures can be implemented by the TMS (108, FIG. 12) to resolve conflicts between various types of keys and certificates. These procedures could be particularly useful during system migration, a change in product lines, an upgrade in security, or other transitions. For example, an upgrade in security may comprise a transition from a software-based key/certificate system to a hardware-based key/certificate system. According to one embodiment, the TMS (108, FIG. 12) may reject connections if a token certificate was issued prior to a certain date. The rejected certificates and connections may be tracked on a "blacklist" which may be distributed to other servers and entities. If two PKI entities are being used by the same workstation (e.g. the workstation is attempting to make two connections, one using the software-based key/cert and the other is using the hardware-based key/cert—token) the request with a TLS certificate issued with a later generation date will be granted.

According to one exemplary embodiment, the security personnel retrieve from the token personalization system (TPS) (104, FIG. 6) a software-based certificate list for the tokens that were issued to a given location. This software-based certificate list could include one or more IP address with the serial numbers of certificates issued to that IP address and the date at which the certificates were issued. The security personnel download this software-based certificate list to all the servers in a given location (step 1400). In an embodiment, the TRMS populates the software-based certificate list to designated PKI servers (step 1405). The PKI server (208, FIG. 2) retrieves the token certificate from a TLS session when the connection is initiated by a token (step 1410). The PKI server checks to see if the unique ID of the workstation (for example the IP address) and the certificate serial number in the received token certificate match those in the software certificate list (determination 1420). If the workstation identifier and the token serial number received in the token certificate are not equivalent to those found in the certificate list, the PKI server permits the connection (step 1425). This is a situation where a new hardware token is connected to a new workstation.

If the station identifier and the token serial number contained in the token certificate match those found in the software certificate list the PKI server also permits the connection, but moves this entry on the software certificate list to its local "blacklist" (step 1430). The token monitoring server then creates a location-based "blacklist" based on the local "blacklist" retrieved from each PKI server (step 1440). The token monitoring server sends the location-based "blacklist" to the security personnel (step 1450). The security personnel logs onto the TRMS (202, FIG. 12) and revokes the software-based certificates (step 1460). The certificate revocation list will be generated and downloaded to all the PKI servers in a given location (step 1470). The PKI server will then reject all the connections initiated by the station/applications that use previously issued software certificates (step 1480).

In summary, a token-based management system for PKI personalization secures the process of delivering PKI data to products that are being personalized in unsecure and untrusted environments. The use of a hardware token with a strong binding to a workstation can aid in the delivery, protection and verification of "trust" as the workstation interacts with the PKI server. Several characteristics of the hardware token described herein prevent its theft, compromise, and subsequent misuse. The hardware tokens can be requested by an authorized factory/product staff (known as a requester) using the Token Requester and Management System (TRMS). The hardware token can be assigned and personalized to a specific location-based trust domain and a specific workstation based on the information provided by the requester. This prevents the hardware token from being stolen and used in an alternative location or computer. The hardware token's credentials are also associated with access control lists (ACLs) which are created for each PKI data that is specific to a product. ACLs are created based on the product information provided by the requester and populated to designated PKI servers by TRMS. If the hardware token/workstation is used to make a PKI data download request that is not authorized, the request will be rejected by the PKI server. A token monitoring system is also in place to monitor ACLs as well as the actual usage of the token throughout its lifecycle. Misuse of the token will result in a review, suspension, or revocation of the token.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A system for token-based management of a PKI personalization process comprising:
a token request and management system (TRMS) configured to gather request information from a requester; options for selecting said request information being limited by an identity and a location of the requester; said request information comprising a location based trust domain, PKI data type, and a workstation identifier;
a token personalization system (TPS) configured to personalize a hardware token such that usage of said hardware token is constrained by said request information;
a workstation corresponding to said workstation identifier being configured to receive said hardware token and using credentials contained within said hardware token to request PKI data from a PKI server, said workstation personalizing a manufactured product with said PKI data;
wherein said PKI server compares credential information supplied by said hardware token to an access control list, said access control list comprising a list of workstations authorized to download said PKI data type;
a token monitor server (TMS), said TMS monitoring actual usage of said hardware token, said TMS maintaining a global active connection list and a global blacklist of tokens that have been suspended or revoked; wherein connections requested by workstations using credentials of a hardware token that has been suspended or revoked are rejected.

2. The system of claim 1, said hardware token being restricted from downloading any additional PKI data types.

3. The system of claim 1, wherein said hardware token is personalized with a certificate authority corresponding to said trust domain, said hardware token being restricted from downloading any PKI data from outside said trust domain.

4. The system of claim 1, wherein said TPS personalizes said hardware token with keys and certificates, said certificates binding a workstation identifier to a trust domain, said hardware token being further bound to said workstation corresponding to said workstation identifier.

5. The system of claim 4, further comprising a token validator tool, said token validator tool verifying that said hardware token is connected to said workstation corresponding to said workstation identifier.

6. The system of claim 1, wherein said access control list is updated as additional hardware tokens are requested through said TRMS.

7. The system of claim 1, wherein said TMS creates the global active connection list to be congruent from active connection lists retrieved from PKI servers, said active connection lists recording use of said hardware tokens by said PKI servers, said global active connection list being compared to an access control list to identify lapsed hardware tokens, said lapsed tokens having been inactive for a specified period of time, said lapsed tokens suspended from being used to making connections.

8. The system of claim 1, wherein said workstation attempting to make a connection to said PKI server with outdated credentials triggers a revocation request for said outdated credentials, said revocation request being submitted to said TRMS and an updated certificate revocation list being populated back to said PKI server to reject a connection initiated by said workstation with outdated credentials.

9. The system of claim 8, wherein said revocation request was triggered based on the global blacklist maintained by said TMS, said TMS being used to retrieve a local blacklist from said PKI server and verify that portions of the global blacklist contained on said PKI server are congruent with said global blacklist.

10. The system of claim 1, wherein a requester logs into said TRMS, said TRMS providing a user interface for selecting said request information from available options, said TRMS restricting availability of said options according to an identity of said requester.

11. The system of claim 10, wherein said request information is restricted to a trust domain corresponding to a location of said requester; said request information being restricted according to PKI types used at said location.

\* \* \* \* \*